tioned, a front substitute tripping arm 41 is provided to intercept the stop finger 40 when the crank is in the reverse position from that first mentioned, and these tripping arms are arranged to move together by the suitable arrangement of their respective pivotal points whereby to stop the crank at either diametral point in its revolution and to provide the off-center position at either diameter, and with respect to the substitute connecting rod, whether the substitute blade is in the operative position in the ground, as shown in Fig. 4, or in the inoperative position out of the ground, as shown in Fig. 3.

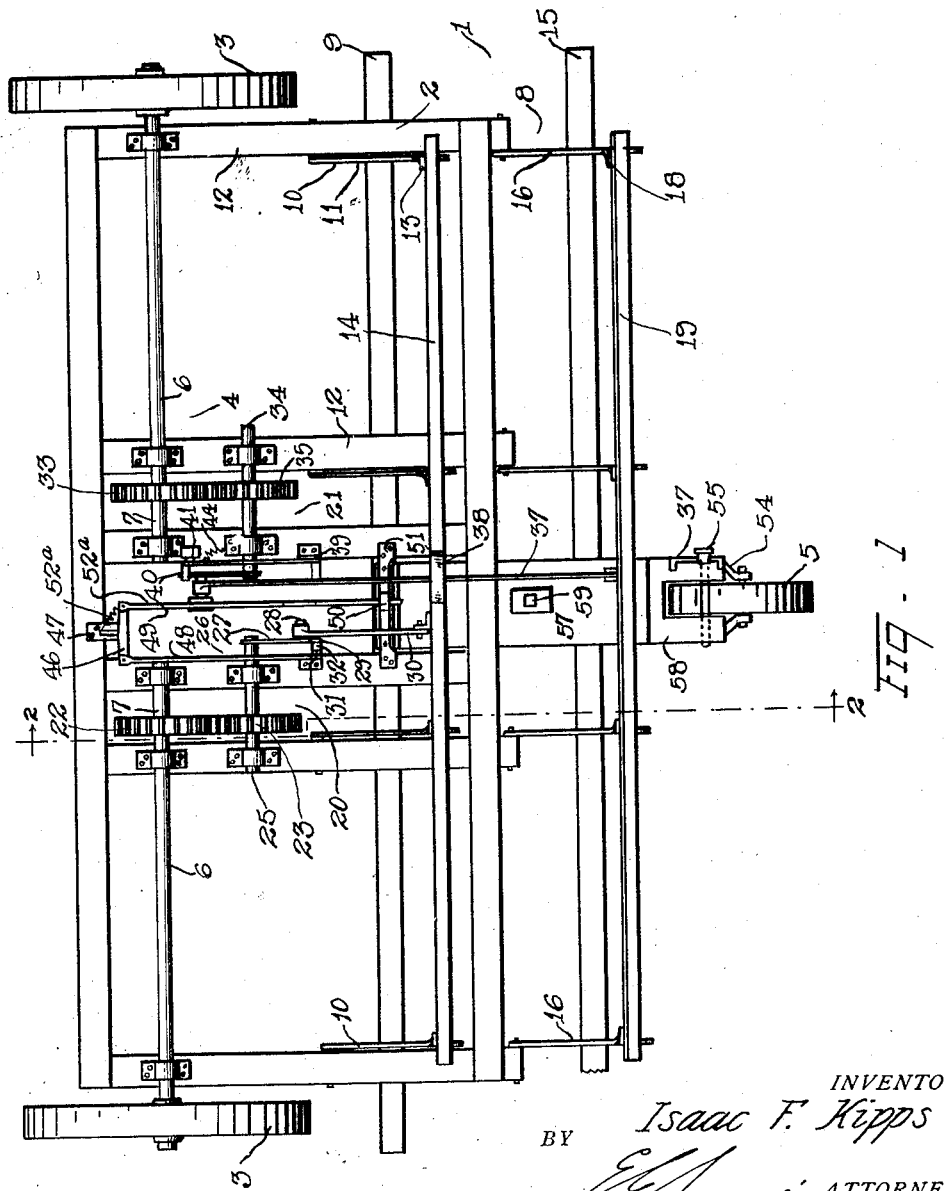

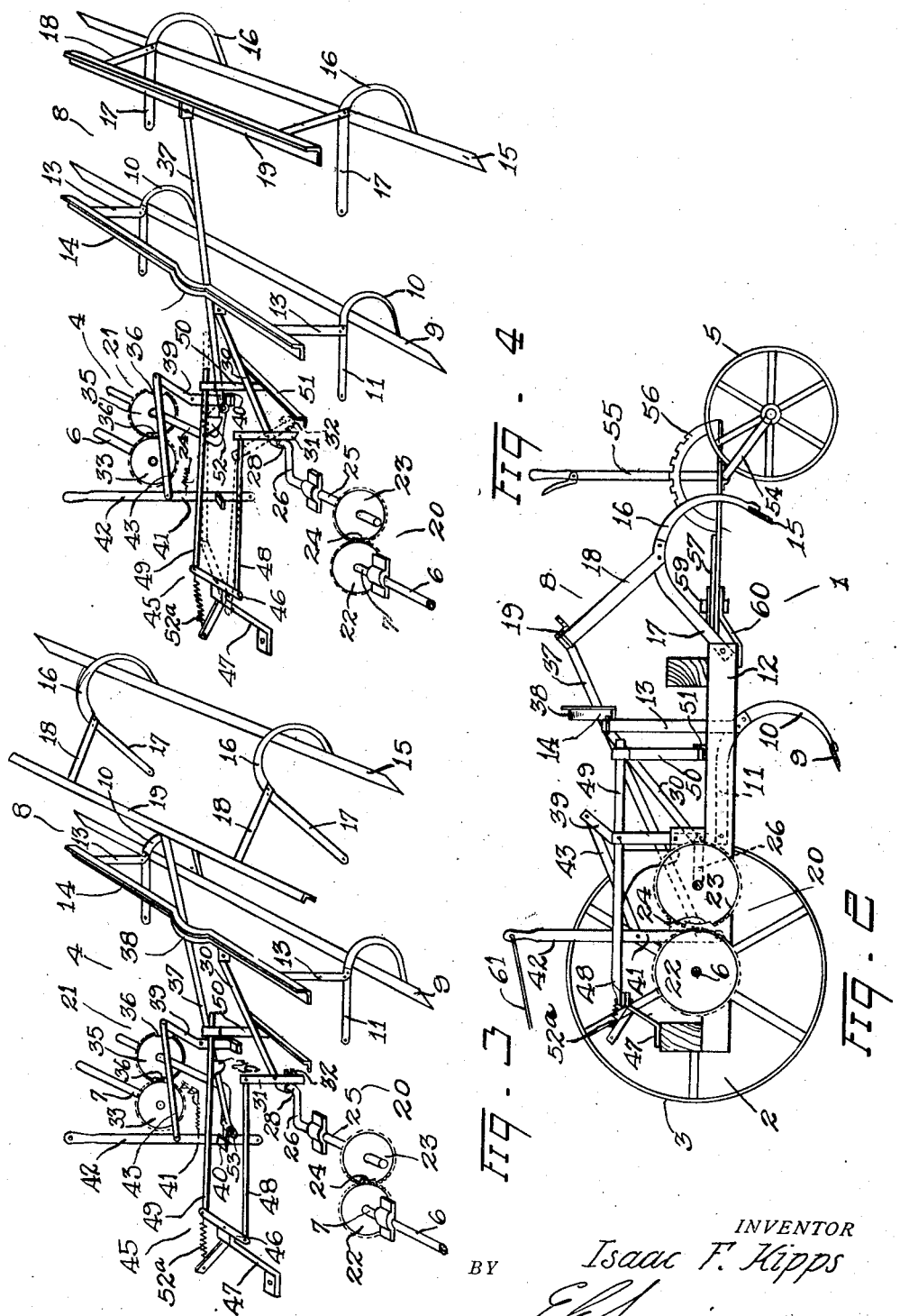

The front tripping arm 41 has an upward extension forming a tripping lever 42 and this, with a connecting rod 43, provides for moving these two substitute tripping arms in unison, and these arms are fulcrumed so that a direct forward movement of the tripping lever may be utilized to overcome the frictional resistance of the finger against the respective off-sets, due in the one case by the weight of the substitute blade and its kindred parts, and in the other case to the frictional resistance of the soil; and as the return movement is obviously free of this resistance, a spring 44 is utilized to return both levers simultaneously to the set position.

By this arrangement, the substitute blade 15 may be secured in the operative position in the ground or may be provided with like securement due to the offset position of the respective parts while the blade is out of the ground, and the substitute pinion provided with protection against accidental damage as before mentioned and with either mutilation moved to its adjacent position to the spur gear.

Operating in conjunction with the respective tripping arms and for the purpose of operating the blades on their hinged points, is a tripping mechanism 45 consisting of a cross bar 46 pivotally mounted on the frame by means of an arm 47 and attached to one end of the cross bar is a small connecting rod 48 connecting this end with the main tripping arm 31 of the main mechanism, and a releasing arm 49 is similarly attached to the other end of the cross arm and extending rearward has its free end slidably mounted in an upright 50 for movement therein, the upright being secured to the longitudinal members 12 of the frame by means of an angular cross piece 51 and this releasing arm is provided with a depending portion forming a trip 52 and with the trip positioned to be contacted by the stub shaft of the substitute crank at each revolution.

Having reference to Fig. 3, it is now apparent that a forward movement of the tripping lever 42 will release the substitute crank from its position there shown, and as this crank rotates, its stub shaft will strike the trip and move it rearwardly, which movement will force the releasing arm backward in its upright, as shown by the dotted lines in Fig. 4, and this movement of that arm will operate through the connecting rod 48 and cross bar 46 to move the tripping arm 31 of the main mechanism to release the main crank whereon the pressure of the soil against the main blade will tend to throw the main beam forward on its hinges and this main beam being connected to the stub shaft of the main crank by the main connecting rod, will move the crank downward when the teeth of the main pinion will engage the main gear and the continuous movement of that gear will rotate the pinion through a complete revolution and until the mutilation again assumes the position adjacent to this gear, when the main blade will have been raised and then lowered again to the operative position in the ground, to be secured therein, as the main tripping arm has now been returned to its normal position to intercept the finger of the main crank as it has completed its revolution, by a spring 52ª as shown.

It is now apparent that a complete cycle of operation of the main blade moves that blade from and returns it to the ground. During that movement and to prevent what is commonly called a "skip" the initial movement of the main blade is restrained, in other words, does not occur until the substitute crank has practically completed one-half of its revolution which movement is necessary to release the main blade and permit it to start it on its cycle. This half revolution of the substitute crank brings the substitute blade to the ground to move into the ground as the main blade moves out of the ground which concurrent movements of the respective blades prevents the skips as above mentioned, and also tends to eradicate a natural ridge which would ordinarily be formed, the second blade taking up the work as the first one leaves the ground, thereby leaving the ground surface in its natural condition.

The crank has now passed to the off-center position and the substitute blade is secured in the ground to perform the function of the main blade in its absence therefrom. The main blade then completes its cycle and by again moving the operating lever forward, the substitute blade is raised out of the ground to its normal position of rest, as shown in Fig. 3.

The blades are now both in the position as shown in Fig. 3 and will remain in such a position until the tripping lever is again advanced.

Obviously, a roller 53 may be attached to the stub shaft of the substitute crank for the purpose of overcoming friction during its period of contact with the trip 52.

For the purpose of adjusting the depths of cut of the respective blades, the castor wheel 5 is hingedly attached to a platform by means of side arms 54 of a shape bent to form an inverted U and one of these side arms continue to form a lever 55 (which lever may be separate and attached thereto) and this lever with a quadrant 56, which is likewise attached to the platform, provides means wherewith to raise and lower the rear end of the machine thus regulating the depth of cut.

For the purpose of providing the castor effect of this wheel, a main platform 57 extends from the angle cross piece 51 back under the rear lateral member of the frame to both of which member it is secured, and what might be termed an auxiliary platform 58 is passed under the platform to be pivotally secured thereto by means of a king bolt 59 and for added strength, a strap 60 encircles the king bolt on the under side of the platform and passing back is secured to the frame.

In use the weeder is moved over the ground in the usual manner of such implements and its form and construction make it adaptable to large scale operation from the fact that a weeder of this description may constitute a sectional part of a long weeder, such as are used behind tractors, and the operating lever being constructed for operation by a forward pull, provides for dumping from a tractor, as with a cord 61, shown in Fig. 2, which cord may be utilized to trip the dumping mechanism from a remote distance.

It is obvious from the above that one pull on the tripping lever completes the cycle of operation of the main blade and that it requires a second pull on this lever to restore the substitute blade to its inoperable position, hence the operator of the tractor will be governed in tripping the main blade by the amount of weeds accumulated thereon, but the time for restoring the substitute blade to its inoperative position is wholly at the option of the operator and may be accomplished at an opportune time.

With the main blade in the ground and set therein by the regulation of the castor wheel, the weeds are cut as the weeder moves over the ground drawn by the tractor and as the weeds accumulate upon the main blade after a certain distance run and depending upon the amount of growth encountered, the tripping lever is pulled when the substitute blade will enter the ground and immediately proceed to take up the work of the main blade, the main blade then leaving the ground to be raised to an inoperative position, and when in this raised position weeds will fall therefrom so that the blade will re-enter the ground in a clean state.

When this cycle of operation has been completed, the operating lever is given a second pull and the substitute blade is raised to the inoperative position.

Having thus described my invention, I claim—

1. A constant cutting self dumping weeder comprising a frame provided with drive wheels, a cutting mechanism comprising a main blade and a substitute blade, positioned in tandem and hingedly mounted on said frame, and an operating mechanism mounted on said frame and comprising means to lower said substitute blade into the ground and to automatically dump the main blade, and means to trip the substitute blade for automatic return to its original position.

2. A constant cutting self dumping weeder comprising a vehicle frame provided with drive wheels, a weed cutting mechanism comprising a main blade and a substitute blade, hingedly mounted on said frame and positioned in tandem, and an operating mechanism mounted on said frame and comprising a main mechanism and a substitute mechanism, said mechanisms being operably attached to the respective blades of the weed cutting mechanism and adapted to automatically change the relative position of said blades and to maintain one blade constantly in the operative position in the ground during the change.

3. A constant cutting self dumping weeder comprising a frame supported by a pair of independently mounted drive wheels and a castor wheel, a weed cutting mechanism comprising a plurality of tandemly arranged cutting blades hingedly mounted on said frame, and consisting of a main blade and a substitute blade, an operating mechanism mounted on said frame and consisting of a main mechanism and a substitute mechanism adapted to be driven by the respective drive wheels, said mechanisms being adapted to automatically perform a complete cycle of raising and lowering the main blade, and lowering said substitute blade, and means to independently raise said substitute blade.

4. A constant cutting self dumping weeder comprising a frame supported at its forward end by independently mounted drive wheels and at its rear end by a castor wheel, a pair of tandemly arranged cutting blades consisting of a main blade and a substitute blade hingedly mounted on said frame, and an operating mechanism mounted on said frame and consisting of a main mechanism and a substitute mechanism, adapted to be driven by the respective drive wheels, said main mechanism being adapted to automatically perform a complete cycle of raising and lowering said main blade, and said substitute mechanism being adapted to alternately lower said substitute blade or raise said substitute blade, and to automatically trip said main mechanism.

5. A constant cutting self dumping weeder comprising a vehicle frame provided with drive wheels, axles rotatably mounted on said frame, and secured to the respective drive Patented Oct. 15, 1929

1,731,579

UNITED STATES PATENT OFFICE

ISAAC F. KIPPS, OF WALLA WALLA, WASHINGTON

CONSTANT-CUTTING SELF-DUMPING WEEDER

Application filed April 26, 1928. Serial No. 272,875.

This invention relates to weeders of the vehicle type and has as one of its objects to provide a weeder that is self dumping and that is provided with a tripping means adapted for remote operation as from the operator of a tractor.

Another object of the invention is to provide a weeder that may be united in gangs with each unit of the gang under direct and independent control of the operator, thus saving extra labor for that purpose.

A further object of the invention is to provide a weeder that will clean its blade without stopping its operation and without leaving a skip.

A further object of the invention is to provide a weeder that will smooth out the ridge which is left as the main cutting blade leaves the ground for cleaning purposes.

A further object of the invention is to provide a weeder that is relatively cheap to manufacture and that is highly efficient in operation.

With these and other objects in view, reference is now had to the accompanying drawings in which Fig. 1 is a plan view of the weeder;

Fig. 2 is a side elevation of the weeder taken on the line 2—2 of Fig. 1;

Fig. 3 is a perspective view, in rather diagrammatic form, of the working parts with the drive wheels not shown, and with the blades in a position for operation; and Fig. 4 is a similar view to Fig. 3 but showing the blades in one position where the main blade has been returned to the ground and just before the substitute blade has been tripped for return to the inoperative position.

Having reference to the drawings like numerals refer to like parts throughout the several views and the numeral 1 refers to a weeder which consists in the main of a vehicle frame 2, of a general rectangular form, and the frame is supported preferably by a pair of forwardly positioned wheels serving as drive wheels 3 wherewith to drive an operating mechanism 4, to be explained, mounted on said frame, and a rearwardly positioned castor wheel 5 adapted to permit the weeder to turn readily during operation, in the usual manner of said implements.

The drive wheels 3 are independently mounted on the frame, with relation to each other, and are provided with inwardly extended axles 6 journalled on the frame and secured to the drive wheels for rotation therewith, and these axles are arranged with their inner ends 7 terminating toward the center of the machine for a purpose to be explained.

Attached to the frame is a weed cutting mechanism 8 consisting of a plurality of cutting blades, tandemly arranged, and comprising the following:

Positioned under the rear body portion of the frame is a main cutting blade 9, which blade is so termed as it is the principal blade of the machine.

To this blade is attached, in the usual manner, goosenecks 10 of the standard type, and having forwardly extending arms 11, which arms are hinged to the frame in any suitable manner or by bolts passing through the end of the arms and through the longitudinally positioned members 12 of the frame in a manner to permit raising and lowering the blade for dumping purposes.

For the purpose of dumping the blade, uprights 13 are provided which uprights are secured to the goosenecks in a generally perpendicular position with respect to the arm thereof, and a main beam 14, paralleling the blade, is carried by these uprights to provide for controlling the blade from above the frame, and is utilized in addition thereto to provide for uniformly raising and lowering the blade throughout its length during the dumping operation.

Attached to the rear end of the frame in a similar manner to the main blade just described, is a substitute blade 15 having similar goosenecks 16 to the goosenecks of the main blade for similar attachment to the rear end of the said longitudinal members by their respective arms 17 and these goosenecks are likewise equipped with uprights 18 which uprights carry a substitute beam 19 also positioned above the frame in a like manner to the main beam, which beam is utilized to raise and lower this blade as before explained for the main blade.

It may be here explained that these blades are operated by separate mechanisms constituting the operating mechanism 4, and that the operating mechanism and the parts connected therewith, and the main blade of the cutting mechanism will be differentiated by the addition of the word "main", and that that mechanism operating the substitute blade will utilize the differentiating term "substitute" for the purpose.

For the purpose of operating the blades, the operating mechanism 4 is operably mounted on the frame and comprises a main mechanism 20 and a substitute mechanism 21, which mechanisms will now be explained in their order.

The main mechanism 20 consists of a driving gear 22, in the nature of a spur gear, secured to the inner end 7 of one of said axles for rotation therewith, and positioned in cooperable relation with this spur gear 22 is a mutilated spur pinion 23 positioned with relation to the spur gear to mesh with that member under certain conditions to be explained, and normally resting with its mutilated part 24 adjacent to the gear in such a manner as to permit that member to have a free and unrestricted rotative movement with the respective drive wheels for the purpose of disconnecting the respective gears during the period of time when the blades are required to remain stationary.

The mutilated spur pinion 23 is mounted on a shaft 25 and is secured thereto for rotative movement therewith and the shaft is journalled on the frame of the machine in the usual manner of such construction, and is provided on its inner end with a crank 26, the crank consisting preferably of a flat piece of metal 27 secured to the shaft in a manner to provide for the throw of the crank, and this member is provided near its outer end with a stub shaft 28 wherewith to form a bearing (for a purpose to be explained), and the flat member 27 has its extreme outer end extended and shaped to form a stop finger 29, the purpose of which will be presently explained.

Mounted on the stub shaft 28 above mentioned, is a main connecting rod 30 which is extended rearwardly and with slight inclination for pivotal securement to the main beam 14 and this connecting rod operably connects the main blade with its respective mechanism whereby the main blade may be raised and lowered on the respective hinges during one complete revolution of the crank and the spur pinion.

A vertically positioned main tripping arm 31 is now pivotally secured to the frame with its pivotal point positioned centrally of the arm to provide a reverse motion to the respective ends thereof, and the tripping arm is provided on its lower end with an inwardly extending offset 32 positioned and adapted to intercept the stop finger 29 at a certain predetermined point in its revolution, and this tripping arm forms a portion of a tripping mechanism which will be presently explained.

The at-rest, or normal position of the crank, is practically horizontal, and the stop finger 29 is so positioned with respect to the crank 26 that when at rest at the point of interception with the offset 32 portion of the main tripping arm 31 that the crank will be secured against further rotation and in its horizontal position until released by movement of the said tripping arm.

It will now be noted, by referring to Figs. 3 and 4, that with the crank in the horizontal position and with the main connecting rod 30 inclined from the horizontal that the bearing assumes an off-center position wherewith to securely hold the blade in the ground against the pressure of the soil during operation which pressure attempts to raise the blade on its hinged point, and while this position of the parts provides for a locking means against the frictional resistance of the soil, it also provides a protecting means for the spur gears against a sudden reversal of the spur pinion with a resulting damage to the teeth of one or both of the gears.

The substitute mechanism 21 consists of a spur driving gear 33 secured to its respective axle in a manner and for a purpose similar to that of the main mechanism and this mechanism includes a similar crank shaft 34 similarly mounted on the frame, and mounted on this crank shaft is a similar mutilated spur pinion 35 with the exception that this pinion is equipped with a pair of diametrically positioned mutilations 36 instead of the single mutilation of the first mentioned pinion 23.

The crank of this crank shaft is provided with a like stub shaft and a substitute connecting rod 37 is journalled on this stub shaft and extends rearwardly in a like inclined position to be pivotally connected to the substitute beam 19.

This substitute connecting rod 37 is arranged to pass under the main beam 14 and as it rises and falls in its movement following the movement of its respective crank, an arch 38 is provided in the main beam to provide for this vertical movement. The arch also provides for shortening the main uprights 13, their length then being determined only by the necessary inclination of the main connecting rod.

A rear substitute tripping arm 39 is similarly mounted on the frame and in a position opposite to the main tripping arm 31 and this arm is adapted to intercept the stop finger 40 of the substitute crank when that member is likewise in the off-center position with relation to the substitute connecting rod 37, and in this case, as may be inferred from the fact of the two mutilations of the pinion menwheels for rotation therewith, a pair of tandemly arranged cutting blades consisting of a main blade and a substitute blade hingedly mounted on said frame, an operating mechanism mounted on said frame and adapted to automatically alter the position of said blades, said mechanism consisting of a main mechanism comprising a spur gear secured to one of said axles, a mutilated spur pinion positioned in cooperable relation with the spur gear and normally resting with its mutilated part adjacent to said gear, a crank shaft mounted on said frame and secured to and rotatable with said spur pinion, a connecting rod connecting said crank shaft with said main blade, and means to stop the rotation of said crank shaft at each complete revolution, and a substitute mechanism comprising a spur gear secured to one of said axles, a mutilated spur pinion positioned in cooperable relation with the spur gear and normally resting with a mutilated part adjacent to said gear, a crank shaft mounted on said frame secured to and rotatable with said spur pinion, a connecting rod connecting said crank shaft with said substitute blade, and means to stop the rotation of said crank shaft at each half revolution, and means to trip said mechanisms.

6. A constant cutting self dumping weeder comprising a vehicle frame provided with independently mounted drive wheels, axles rotatably mounted on said frame and secured to said drive wheels for rotation therewith, a pair of tandemly arranged cutting blades consisting of a main blade and a substitute blade hingedly mounted on said frame, an operating mechanism mounted on said frame and adapted to automatically alter the position of said blades, and consisting of a main mechanism comprising a spur gear secured to one of said axles, a mutilated spur pinion positioned in cooperable relation with the said spur gear and normally resting with its mutilated part adjacent to the gear, a crank shaft mounted on said frame and secured to and rotatable with said spur pinion, and means operable mounted on said crank shaft to operate said main blade, and a substitute mechanism comprising a spur gear secured to the other of said axles, a mutilated spur pinion positioned with cooperable relation to the spur gear and having two diametrally positioned mutilations, and normally resting with one of its mutilations adjacent to the gear, a crank shaft mounted on said frame and secured to and rotatable with said spur pinion, and means operably connected with said crank shaft to operate the substitute blade, and a tripping lever pivotally attached to said frame and adapted to stop the main crank at each revolution and the substitute crank at each half revolution.

7. A constant cutting self dumping weeder comprising a vehicle frame provided with independently mounted drive wheels, axles rotatably mounted on said frame and secured to said drive wheels for rotation therewith, a pair of tandemly arranged cutting blades consisting of a main blade and a substitute blade hingedly mounted on said frame, an operating mechanism mounted on said frame and adapted to automatically alter the position of said blades, and consisting of a main mechanism comprising a spur gear secured to one of said axles, a mutilated pinion positioned in cooperable relation with the spur gear and normally resting with its mutilated part adjacent to the gear, a crank shaft secured to and rotatable with said spur pinion, said crank shaft being provided with a crank including a stub shaft, a main connecting rod connecting said stub shaft and said main blade and extended rearwardly and with an inclination to provide a normal off-center with the crank when at rest, and a substitute mechanism comprising a spur gear secured to the other of said axles, a mutilated spur pinion positioned in cooperable relation to the spur gear and having two diametrally positioned mutilations, and normally resting with one of its mutilations adjacent to the gear, a crank shaft mounted on said frame and secured to and rotatable with said spur pinion, and provided with a crank including a stub shaft, a substitute connecting rod connecting said stub shaft with said substitute blade and extended rearwardly and with slight inclination to provide a normal off-center with the crank when at rest, and a tripping mechanism pivotally attached to said frame and adapted to stop the main crank at each revolution and the substitute crank at each half revolution, and means to synchronize the movements of said main and substitute mechanisms.

8. A constant cutting self dumping weeder comprising a vehicle frame provided with independently mounted drive wheels, axles rotatably mounted on said frame and secured to said drive wheels for rotation therewith, a weed cutting mechanism hingedly attached to said frame and comprising a main blade and a substitute blade, said main blade consisting of a cutting blade and goosenecks attached thereto, for hinged attachment to said frame, uprights attached to said goosenecks and provided with a main beam mounted on and provided with uprights, in parallel relation to said main said uprights, and said substitute blade comprising blade, and goosenecks attached thereto for a blade, and goosenecks attached thereto for hinged attachment to said frame, uprights attached to said goosenecks and provided with a substitute beam mounted on said uprights, in parallel relation to said substitute blade, an operating mechanism mounted on said frame and adapted to automatically alter the position of said blade, and consisting of a main mechanism comprising a spur gear secured to one of said axles, a mutilated spur pinion positioned in cooperable relation with the spur gear, and normally resting with its mutilated part adjacent to the gear, a crank shaft mounted on said frame and secured to and rotatable with said spur pinion, and having a crank including a stub shaft, a main connecting rod connecting said stub shaft and said main beam and extended rearwardly and with an inclination to provide a normal off-center with the crank when at rest, and a substitute mechanism comprising a spur gear secured to the other of said axles, a mutilated spur pinion positioned in cooperable relation to the spur gear and having two diametrally positioned mutilations, and normally resting with one of its mutilations adjacent to the gear, a crank shaft mounted on said frame and secured to and rotatable with said spur pinion, and provided with a crank including a stub shaft, a substitute connecting rod connecting said stub shaft with said substitute beam, and extended rearwardly and with slight inclination to provide a normal off-center with the crank when at rest, a tripping mechanism comprising a cross bar mounted on said frame and provided with a connecting rod attached to one end of said cross bar, and provided at its other end with a tripping arm adapted to stop the main crank at each revolution thereof, and provided with a releasing arm attached to the other end of said cross bar, and having a trip adapted for engagement with the crank shaft of the substitute mechanism, said mechanism being arranged to synchronize the movements of the substitute mechanism with the main mechanism.

9. A constant cutting self dumping weeder comprising a vehicle frame provided with independently mounted drive wheels, axles rotatably mounted on said frame and secured to said drive wheels for rotation therewith, a cutting means comprising a main cutting blade and a substitute blade, goosenecks attached to said blades for hinged attachment to said frame, uprights attached to said goosenecks, a main beam attached to said uprights in parallel relation to said main blade, a substitute beam attached to said uprights in parallel relation to said substitute blade, said blades being arranged in tandem with the main blade positioned beneath the rear portion of the frame and with the substitute blade positioned at the rear of said frame, an operating mechanism mounted on said frame and adapted to automatically alter the position of said blades, and consisting of a main mechanism comprising a spur gear secured to one of said axles, a mutilated spur pinion positioned in cooperable relation with the spur gear and normally resting with its mutilated part adjacent to the gear, a crank shaft mounted on said frame and rotatable with said pinion, said crank shaft being provided on its inner end with a crank including a stub shaft, a main connecting rod connecting said stub shaft and said main beam, and extended rearwardly and with slight inclination to said crank, to be positioned off-center with said crank, and a substitute mechanism comprising a spur gear secured to one of the axles, a mutilated spur pinion positioned in cooperable relation with said gear and having two diametrically positioned mutilations, and normally resting with one of its mutilations adjacent to the gear, a crank shaft mounted on said frame and rotatable with said pinion, said crank shaft being provided on its inner end with a crank including a stub shaft, a substitute connecting rod connecting said stub shaft with said substitute beam, and extended rearwardly and with slight inclination to provide a normal off-center with the crank, a finger attached to and extended in prolongation of said cranks, a main tripping arm pivotally attached to said frame and provided with an offset adapted to intercept one of said fingers at each revolution of the main crank, rear and front substitute tripping arms pivotally attached to said frame, and provided with an offset adapted to intercept the other of said fingers at each half revolution of said substitute crank, a tripping lever adapted to operate said rear and front substitute tripping arms to manually release said substitute crank at either half revolution, and a tripping mechanism comprising a cross bar pivotally mounted on the frame and provided with a connecting rod attached to one end of said cross bar and to said main tripping arm, and provided with a releasing arm attached to the other end of said cross bar, said releasing arm having a trip arranged to be engaged by the said substitute crank on each alternate half revolution, to automatically release said main mechanism for operation to dump and return said main blade to the ground.

In testimony whereof I affix my signature.

ISAAC F. KIPPS.